(12) United States Patent
Yan et al.

(10) Patent No.: US 10,636,006 B2
(45) Date of Patent: Apr. 28, 2020

(54) METHODS, DEVICES, AND SYSTEMS FOR PRIORITIZING MOBILE NETWORK TROUBLE TICKETS BASED ON CUSTOMER IMPACT

(71) Applicants: AT&T INTELLECTUAL PROPERTY I, L.P., Atlanta, GA (US); AT&T Mobility II LLC, Atlanta, GA (US)

(72) Inventors: He Yan, Berkeley Heights, NJ (US); Lynn Lopez, Easton, WA (US); Jason Pipkin, Joppa, MD (US); Kathryn Childs, Concord, NC (US); Chichi Boderoux, Castro Valley, CA (US); Carla Sykes, Southampton, PA (US); Kevin Wilkins, Brick, NJ (US); Robert Samson, McDonough, GA (US); Sarat Puthenpura, Berkeley Heights, NJ (US); Zihui Ge, Madison, NJ (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 227 days.

(21) Appl. No.: 15/493,604

(22) Filed: Apr. 21, 2017

(65) Prior Publication Data
US 2018/0308031 A1   Oct. 25, 2018

(51) Int. Cl.
*G06Q 10/06* (2012.01)

(52) U.S. Cl.
CPC ....... *G06Q 10/06375* (2013.01); *G06Q 10/06* (2013.01); *G06Q 10/06311* (2013.01)

(58) Field of Classification Search
CPC ...... G06Q 10/06; G06Q 10/20; G06Q 30/016; H04L 41/5074; H04L 41/5009
See application file for complete search history.

(56) References Cited

U.S. PATENT DOCUMENTS 5,920,846 A * 7/1999 Storch ............. G06Q 10/06311
                                                    705/7.14
6,298,233 B1 * 10/2001 Souissi ................ H04W 24/00
                                                    455/423

(Continued)

FOREIGN PATENT DOCUMENTS

WO        2013149892 A1    10/2013

OTHER PUBLICATIONS

Incident Management—A Practical Approach to Adoption ServiceNow, 2016 (Year: 2016).*

(Continued)

*Primary Examiner* — Scott L Jarrett
(74) *Attorney, Agent, or Firm* — Guntin & Gust, PLC; John G. Rauch

(57) ABSTRACT

Aspects of the subject disclosure may include, for example, embodiments include receiving a first trouble ticket reporting a first service outage of a communication network and a second trouble ticket reporting a second service outage of the communication network. Further embodiments can include determining a first customer impact according to the first service outage and determining a second customer impact according to the second service outage. The first customer impact is determined by a degradation of quality metrics, a site priority, and a number of complaints due to each service outage. Additional embodiments can include identifying that the second customer impact is higher than the first customer impact. Also, embodiments can include prioritizing a resolution of the second trouble ticket over the first trouble ticket according to the second customer impact being higher than the first customer impact. Other embodiments are disclosed.

20 Claims, 9 Drawing Sheets

(56) References Cited

U.S. PATENT DOCUMENTS

| | | | |
|---|---|---|---|
| 6,928,147 B2 | 8/2005 | Gonsalves et al. | |
| 7,010,437 B2* | 3/2006 | Lubkeman | G06Q 50/06 |
| | | | 702/58 |
| 7,120,633 B1* | 10/2006 | Kromer | G06F 11/0748 |
| 7,568,133 B1 | 7/2009 | Bette et al. | |
| 7,742,576 B2 | 6/2010 | Jean et al. | |
| 7,826,597 B2 | 11/2010 | Welch et al. | |
| 7,974,387 B2 | 7/2011 | Lutz et al. | |
| 8,239,448 B2* | 8/2012 | Lo | H04L 41/0806 |
| | | | 709/203 |
| 8,274,904 B1* | 9/2012 | Lu | H04L 1/22 |
| | | | 370/218 |
| 8,589,198 B2* | 11/2013 | McMullin | G06Q 50/06 |
| | | | 705/7.11 |
| 8,744,830 B2* | 6/2014 | San Andres | H02H 3/063 |
| | | | 703/13 |
| 8,903,050 B2* | 12/2014 | Beattie, Jr. | H04M 3/30 |
| | | | 379/27.01 |
| 8,903,933 B1* | 12/2014 | Bellini, III | H04L 29/08837 |
| | | | 707/705 |
| 9,179,337 B2* | 11/2015 | Zinevich | H04J 11/0023 |
| 9,426,665 B2* | 8/2016 | Ge | H04W 24/04 |
| 9,877,213 B1* | 1/2018 | Wang | H04W 24/04 |
| 9,942,779 B1* | 4/2018 | Proctor | H04W 24/02 |
| 10,079,736 B2* | 9/2018 | Bellini, III | H04L 41/5074 |
| 2005/0081118 A1 | 4/2005 | Cheston et al. | |
| 2007/0036083 A1* | 2/2007 | Wilson | H04L 41/0686 |
| | | | 370/242 |
| 2007/0100782 A1 | 5/2007 | Reed et al. | |
| 2007/0133780 A1* | 6/2007 | Berner | H04M 3/5166 |
| | | | 379/265.01 |
| 2008/0155564 A1 | 6/2008 | Shcherbina et al. | |
| 2008/0181099 A1* | 7/2008 | Torab | H04L 41/0631 |
| | | | 370/216 |
| 2008/0181100 A1* | 7/2008 | Yang | H04L 41/0654 |
| | | | 370/216 |
| 2008/0304412 A1* | 12/2008 | Schine | H04L 41/5003 |
| | | | 370/235 |
| 2009/0076871 A1 | 3/2009 | Heacock et al. | |
| 2009/0226162 A1 | 9/2009 | Cheng et al. | |
| 2009/0227251 A1* | 9/2009 | Lei | H04J 11/0069 |
| | | | 455/425 |
| 2009/0310774 A1* | 12/2009 | Hendricks | H04M 3/5183 |
| | | | 379/265.13 |
| 2011/0112943 A1* | 5/2011 | Dietz | G06Q 10/06 |
| | | | 705/32 |
| 2013/0051239 A1* | 2/2013 | Meredith | H04W 16/18 |
| | | | 370/241 |
| 2013/0176858 A1* | 7/2013 | Zee | H04L 43/08 |
| | | | 370/241 |
| 2013/0338945 A1* | 12/2013 | Feng | H02J 13/0055 |
| | | | 702/58 |
| 2014/0064245 A1* | 3/2014 | Abraham | H04W 72/10 |
| | | | 370/331 |
| 2014/0129444 A1* | 5/2014 | LeRoy | G06Q 20/14 |
| | | | 705/44 |
| 2014/0269269 A1* | 9/2014 | Kovvali | H04W 24/08 |
| | | | 370/229 |
| 2014/0280920 A1* | 9/2014 | Foley | H04L 43/0817 |
| | | | 709/224 |
| 2014/0376385 A1* | 12/2014 | Boss | H04L 43/0811 |
| | | | 370/242 |
| 2015/0382210 A1* | 12/2015 | Kateley | H04W 24/08 |
| | | | 455/424 |
| 2016/0080248 A1* | 3/2016 | Rijnders | H04W 4/70 |
| | | | 709/224 |
| 2017/0019291 A1 | 1/2017 | Tapia et al. | |
| 2017/0213303 A1* | 7/2017 | Papadopoulos | G06F 16/248 |
| 2017/0353991 A1* | 12/2017 | Tapia | H04W 24/02 |
| 2018/0048921 A1* | 2/2018 | Sood | G11B 27/36 |
| 2018/0076662 A1* | 3/2018 | Maheshwari | G01D 4/006 |
| 2018/0108022 A1* | 4/2018 | Bandera | G06Q 30/016 |

OTHER PUBLICATIONS

ITIL Incident Priority—What Everyone Should Know ITServiceMngnnt.blogspot.com, Jun. 1, 2007 (Year: 2007).*

NetSupport DNA Helpdesk v2.70 NetSupport Ltd., 2007 (Year: 2007).*

Remedy Help Desk 5.5 User's Guide Remedy, Jun. 2003 (Year: 2003).*

ServiceNow User Guide Stanford, Acrio, LLC., 2016 (Year: 2016).*

ServiceNow User Guide University of San Francisco, Feb. 10, 2012 (Year: 2012).*

* cited by examiner

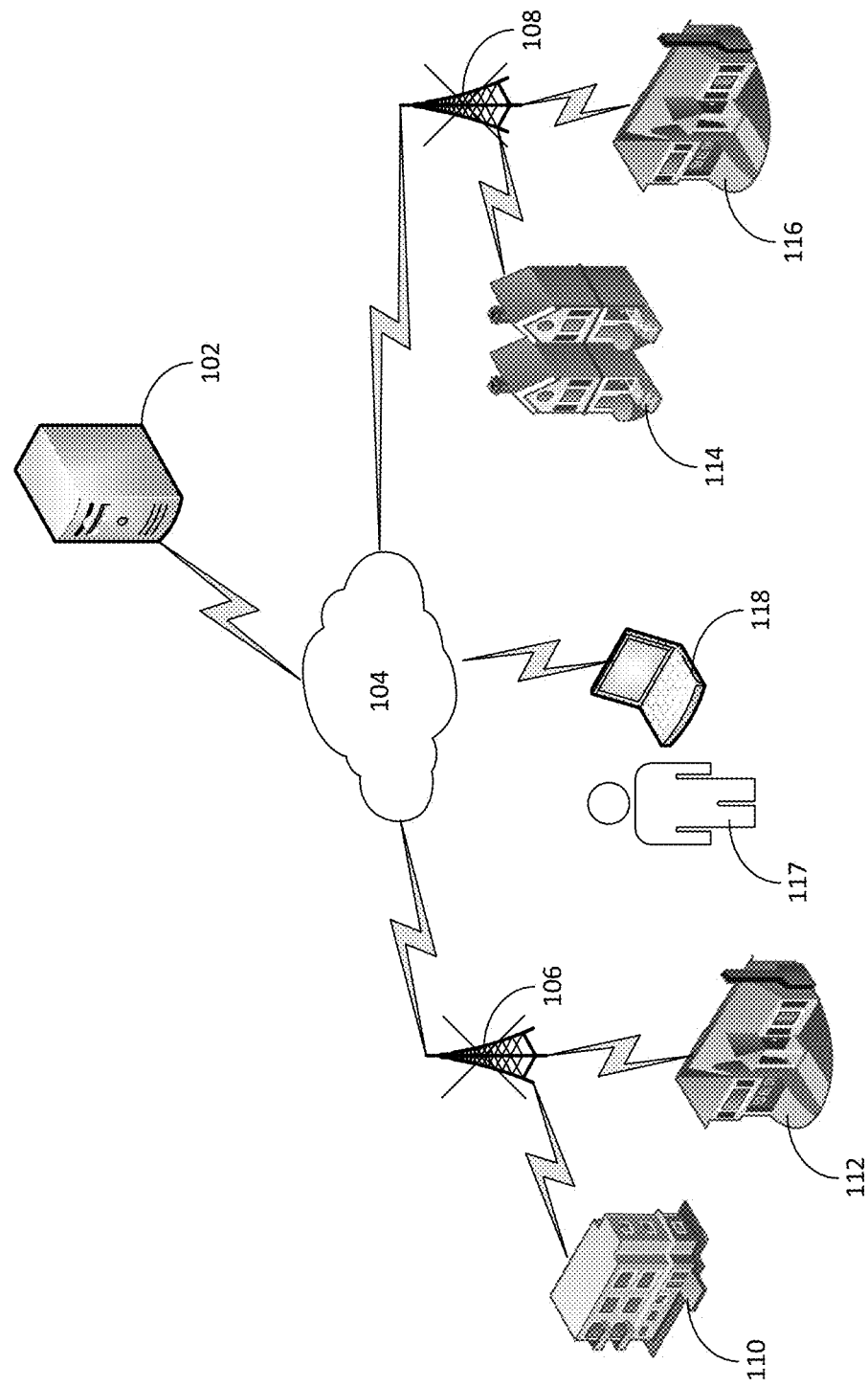

300

METHODS, DEVICES, AND SYSTEMS FOR PRIORITIZING MOBILE NETWORK TROUBLE TICKETS BASED ON CUSTOMER IMPACT

FIELD OF THE DISCLOSURE

The subject disclosure relates to prioritizing mobile network service outages based on customer impact.

BACKGROUND

Traditionally, service outages of portions of mobile network are reported to repair personnel through trouble tickets. A trouble ticket can include any broken/incorrectly configured mobile network equipment that may have caused a service outage. Further, the trouble ticket can be generated by customers/subscribers of the mobile network or mobile service provider personnel. Also, the trouble tickets for service outages are resolved on a first in, first out basis.

BRIEF DESCRIPTION OF THE DRAWINGS

Reference will now be made to the accompanying drawings, which are not necessarily drawn to scale, and wherein:

FIGS. 1A-1C depict illustrative embodiments of prioritizing mobile network service outages based on customer impact;

DETAILED DESCRIPTION

Figure 1B:
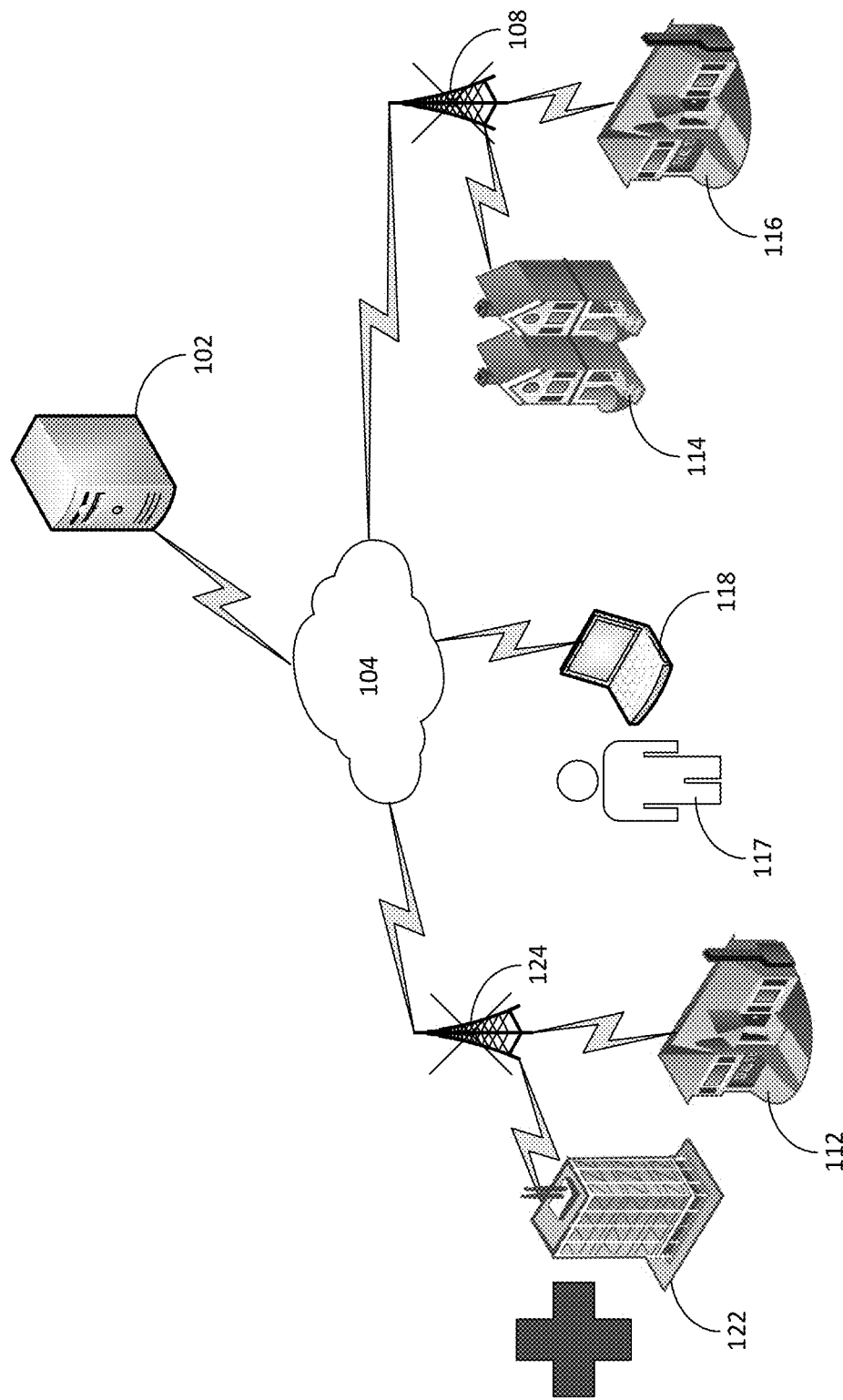

The subject disclosure describes, among other things, illustrative embodiments that can include receiving a first trouble ticket reporting a first service outage of a communication network and a second trouble ticket reporting a second service outage of the communication network. Further embodiments can include determining a first customer impact according to the first service outage and determining a second customer impact according to the second service outage. The first customer impact is determined by a first degradation of a first quality metrics, a first site priority of a first portion of the communication network, and a first number of complaints due to first service outage. The second customer impact is determined by a second degradation of a second quality metrics, a second site priority of a second portion of the communication network, and a second number of complaints due to second service outage. Additional embodiments can include identifying that the second customer impact is higher than the first customer impact. Also, embodiments can include prioritizing a resolution of the second trouble ticket over the first trouble ticket according to the second customer impact being higher than the first customer impact. Other embodiments are described in the subject disclosure.

One or more aspects of the subject disclosure include a device comprising a processing system including a processor and a memory that stores executable instructions that, when executed by the processing system, facilitate performance of operations. Operations can include receiving a first trouble ticket reporting a first service outage of a communication network and a second trouble ticket reporting a second service outage of the communication network. Further operations can include determining a first customer impact according to the first service outage and determining a second customer impact according to the second service outage. The first customer impact is determined by a first degradation of a first quality metrics, a first site priority of a first portion of the communication network, and a first number of complaints due to first service outage. The second customer impact is determined by a second degradation of a second quality metrics, a second site priority of a second portion of the communication network, and a second number of complaints due to second service outage. Additional operations can include identifying that the second customer impact is higher than the first customer impact. Also, operations can include prioritizing a resolution of the second trouble ticket over the first trouble ticket according to the second customer impact being higher than the first customer impact.

One or more aspects of the subject disclosure include a machine-readable storage medium, comprising executable instructions that, when executed by a processing system including a processor, facilitate performance of operations. Operations can include receiving a first trouble ticket reporting a first service outage of a communication network and a second trouble ticket reporting a second service outage of the communication network. Further operations can include determining a first customer impact according to the first service outage, a first site priority of a first portion of the communication network affected by the first service outage, and a first number of customers impacted by the first service outage and determining a second customer impact according to the second service outage, a second site priority of a second portion of the communication network affected by the second service outage, and a second number of customers impacted by the second service outage. Additional operations can include identifying that the second customer impact is higher than the first customer impact according to the first number of customers impacted by the first service outage and according to the second number of customers impacted by the second service outage. Also, operations can include prioritizing a resolution of the second trouble ticket over the first trouble ticket according to the second customer impact being higher than the first customer impact.

One or more aspects of the subject disclosure include a method. The method can include receiving, by a processing system including a processor, a first trouble ticket reporting a first service outage of a communication network and a second trouble ticket reporting a second service outage of the communication network. Further, the method can include determining, by the processing system, a first customer impact according to the first service outage and a first degradation of a first quality metrics, and determining a second customer impact according to the second service outage and a second degradation of a second quality metrics. In addition, the method can include identifying, by the processing system, that the second customer impact is higher than the first customer impact according a first aggregate score of the first service outage and a second aggregate score of the second service outage. Also, the can include prioritizing, by the processing system, a resolution of the second trouble ticket over the first trouble ticket according to the second customer impact being higher than the first customer impact.

Figure 1C:
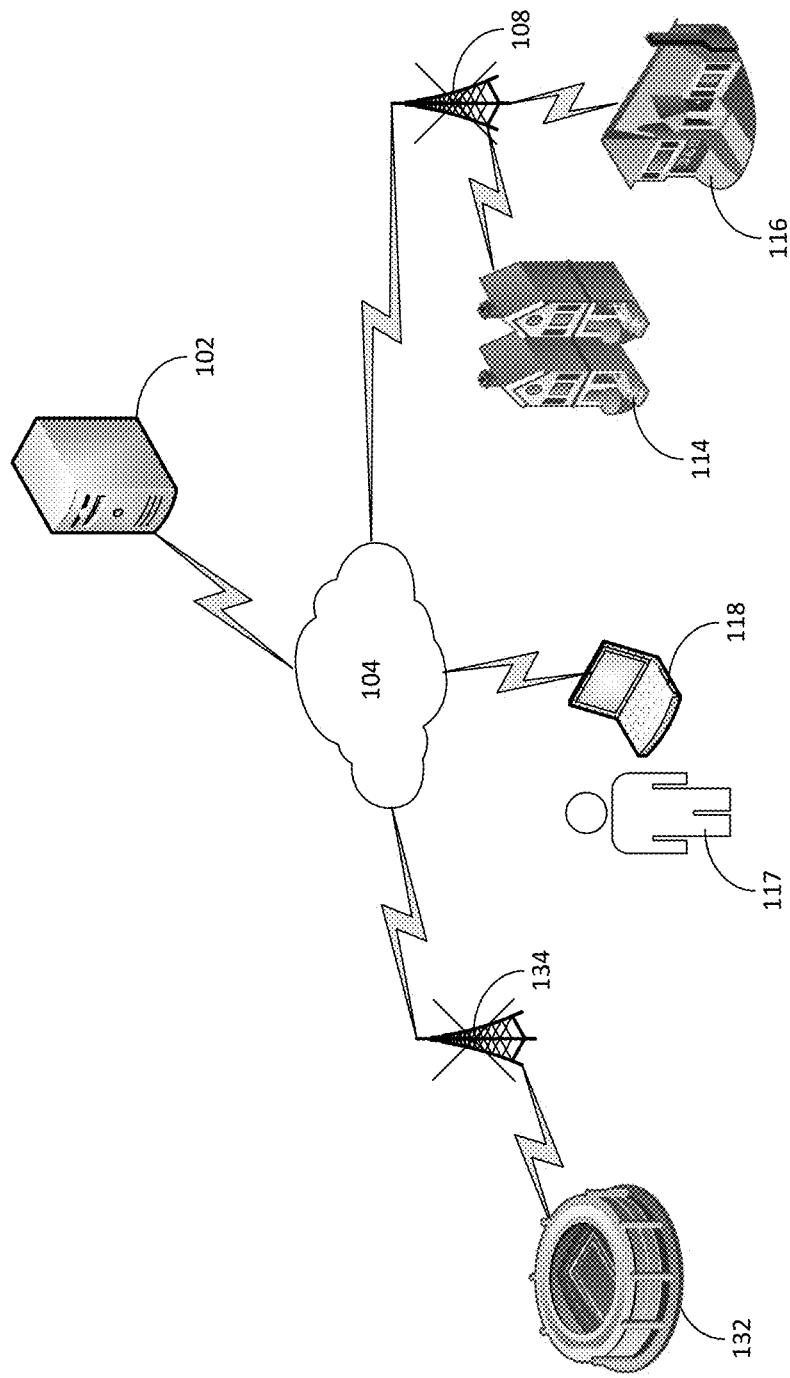

FIGS. 1A-1C depict illustrative embodiments of prioritizing mobile network service outages based on customer impact. Referring to FIG. 1A, in one or more embodiments, the system 100 can include a service management server 102 communicatively coupled to wireless communication equipment 106, 108 over communication network 104. Wireless communication equipment 106, 108 can include, but are not limited to, cell towers, mobile management equipment, routers, or any other wireless equipment that facilitate communication among different mobile devices (e.g. mobile phones, tablet computers, laptop computers, wearable devices, etc.) and different network node across the communication network 104. Communication network 104 can include a wireless communication network, wired/landline communication network, or both. Wireless communication equipment 108 may provide wireless connectivity to mobile devices located in a single family homes 116 or townhomes 114. Further, wireless communication equipment 106 may provide wireless connectivity to mobile device located in a single family home 112 and apartment building 110.

In one or more embodiments, both wireless communication equipment 106, 108 may malfunction at the same time thereby creating a two different service outages. A malfunction can be due to faulty or defective equipment on the wireless communication equipment 106, 108 or the wireless communication equipment 106, 108 can be overloaded with network traffic that impairs its ability to perform its functions adequately (e.g. insufficient memory, processor power, outgoing or incoming bandwidth capacity, lack of network resources, etc.). A first service outage can affect users of mobile devices residing in townhomes 114 and single family home 116. A second service outage can affect users of mobile devices residing in apartment building 110 and single family home 112. Service personnel 117, using a computing device 118 (e.g. mobile phone, table computer, laptop computer, desktop computer, etc.) can issue trouble tickets, notices or alerts to the service management server 102. Each trouble ticket alerts the service management server 102 of each service outage. Further, each trouble ticket can include an identifier of the malfunctioning wireless communication equipment 106, 108, the geographic locations or geographic radius that is affected due to the service outage, and/or the number of users/mobile devices affected by the service outage.

In one or more embodiments, the service management server 102 can receive trouble tickets from service personnel 117 via computing device 118 providing of service outages due to wireless communication equipment 106, 108 malfunctioning. In some embodiments, the service management server 102 can receive a notification from wireless communication equipment 106, 108 themselves that they are malfunctioning. Such notices can include an identifier of the malfunctioning wireless communication equipment 106, 108, the geographic locations or geographic radius that is affected due to the service outage, and/or the number of users/mobile devices affected by the service outage. In other embodiments, the service management server 102 can receive one or more notices from a network management node that has detected the malfunctioning wireless communication equipment 106, 108. Such a notice can include an identifier of the malfunctioning wireless communication equipment 106, 108, the geographic locations or geographic radius that is affected due to the service outage, and/or the number of users/mobile devices affected by the service outage. In further embodiments, the service management server 102 itself can detect the malfunctioning of wireless communication equipment 106, 108. The service management server 102 can at varying or periodic time intervals send a message instructing the wireless communication equipment 106, 108 to respond to indicate wireless communication equipment 106, 108 are functioning properly. If such a response is not received within the predetermined time period, the service management server 102 determines that the wireless communication equipment are malfunction thereby creating service outages. Further, the service management server 102 can query a network management node or service personnel 117 via computing device 118 for the geographic locations or geographic radius that is affected due to the service outage and/or the number of users/mobile devices affected by the service outage. The network management node or service personnel 177 via the computing device 118 can respond to the service management server 102 with such information accordingly.

In one or more embodiments, the service management server can resolve service outages in the order it receives notifications of them. That is, if the service management server 102 receives a notice of the service outage due to the malfunction of wireless communication equipment 108 prior to a notice of the service outage due the malfunction of wireless communication equipment 106, then the service management server 102 resolves the malfunction of wireless communication equipment 108 before resolving the malfunction of wireless communication equipment 106. The service management server 102 can resolve a malfunction of wireless communication equipment 106, 108 by dispatching equipment repair personnel to fix or replace wireless communication equipment 106, 108 or parts thereof. Further, the service management server 102 can resolve a malfunction (e.g. a malfunction due to insufficient memory, processing capacity, incoming/outgoing bandwidth capacity, network resources, etc.) of wireless communication equipment 106, 108 by configuring or sending instructions to a network management node to configure additional memory, processing capacity, incoming/outgoing bandwidth capacity, network resources, etc. In other embodiments, instead of resolving a service outage based on the order it receives notifications of them, the service management server 102 can prioritize each service outage and resolve service outages based on highest priority rather than in the order it receives notifications of them.

In one or more embodiments, the service management server 102 can determine a first customer impact due to the first service outage and a second customer impact due to the second service outage. In some embodiments, a customer impact can be determined by the number of customer affected by a service outage. The service management server 102 obtains the number customer affected by a service outage from a trouble ticket, network management node, or data stored and accessed from an information repository communicated coupled to the service management server 102. Further, the service management server 102 identifies that a customer impact for one service outage is higher than a customer impact for another service outage. In addition, the service management server 102 can prioritize a resolution of one service outage (or a trouble ticket notifying the service outage) over another service outage according the customer impact of the first service outage being higher than the customer impact of the second service outage.

In one or more embodiments, the service management server 102 can detect first quality metrics for a first portion of the communication network 104 affected by the first service outage and detect second quality metrics for a second portion of the communication network 104 affected by the second service outage. Further, the service management server 102 can detect a first degradation of the first quality of metrics and can detect a second degradation of the second quality of metrics. In some embodiments, quality metrics can include throughput, retransmission rate, processing power, memory capacity, bandwidth capacity of incoming/outgoing communication links, and other networks resources of the wireless communication equipment 106, 108. Further quality of metrics include other metrics of communication network 104. In other embodiments, a first customer impact due to the first service outage can be based on or according to the first degradation of the first quality of metrics. For example, the service management server 102 can determine the first quality of metrics for the first service outage affecting single family home 116 and townhomes 114 can include a first throughput of the wireless communication equipment 108. Also, the service management server 102 can determine the first throughput (or any other quality metric) can be below a threshold. Further, the service management server 102 can determine the second quality metrics for the second service outage affecting single family home 112 and apartment building 110 can include a second throughput of the wireless communication equipment 106. Also, the service management server 102 can determine the second throughput (or any other quality metric) can be below a threshold. In addition, the service management server 102 can determine the difference between the first throughput and the threshold can be less than the difference between the second throughput and threshold (note the threshold for wireless communication equipment 108 can be different than the threshold for wireless communication equipment 106). Thus, the service management server 102 can determine the first customer impact based on the difference between the first throughput and the threshold and determine the second customer impact based on the difference between the second throughput and the threshold. Further, the service management server 102 can identify that the second customer impact is higher than the first customer impact because the different between the second throughput and the threshold is greater than the first throughput and the threshold. In addition, the service management server 102 can identify a resolution of the second service outage over the first service outage according to the second customer impact being higher than the first customer impact.

Referring to FIG. 1B, in one or more embodiments, the system 120 includes some of the components of system 100 that can include a service management server 102 communicatively coupled to wireless communication equipment 106, 108 over communication network 104. Wireless communication equipment 108 may provide wireless connectivity to mobile devices located in a single family homes 116 or townhomes 114. Further, wireless communication equipment 106 may provide wireless connectivity to mobile device located in a single family home 112 and hospital 122. In addition, both wireless communication equipment 106, 108 may malfunction at the same time thereby creating a two different service outages. The service management server 102 can receive notification or otherwise detect the service outages as described herein. Detection or notification of the first service outage can be received before detection or notification of the second service outage.

In one or more embodiments, the service management server 102 can identify a first portion of the communication network 104 affected by the first service outage and identify a second portion of the communication network 104 affected by the second service outage. Portions of the communication network 104 can include the buildings and residences affected by the service outages including single family homes 112, 116, townhomes 114, and hospital 122. Further, the service management server 102 can identify affected portions of communication network 104 from a network management node or by accessing information from a database that lists geographic scope affected by the service outages. In addition, the service management server 102 can determine the building affected by the service outages based on the geographic scope of wireless communication equipment 106, 108.

In one or more embodiments, the service management server 102 can determine a first site priority for the first portion of the communication network 104 and determine a second site priority for the second portion of the communication network 104. For example, if a portion of the communication network affected by a service outage include a critical or emergency service building such as hospital 122, then such a portion of the communication network may have a higher priority than a portion of the communication network that only includes residential buildings. That is, critical or emergency service buildings have a more urgent need for restoring service to facilitate and coordinate emergency services than residential buildings that may use mobile devices for only entertainment purposes. Thus, the service management server 102 may determine that the second portion of the communication network 104 affected by the second service outage may have a higher site priority than the first portion of the communication network 104 affected by the first service outage (service management server 102 may designate the first portion of the communication network 104 with a first site priority and designate the second portion of the communication network 104 with a second site priority). Further, the second customer impact may be based on the second site priority and the first customer impact may be based on the first site priority. In addition, the service management server 102 can identify that the second customer impact is higher than the first customer impact. Also, the service management server 102 can prioritize a resolution of the second service outage over the first service outage according to the second customer impact being higher than the first customer impact.

Referring to FIG. 1C, in one or more embodiments, the system 130 includes some of the components of system 100 that can include a service management server 102 communicatively coupled to wireless communication equipment 134, 108 over communication network 104. Wireless communication equipment 108 may provide wireless connectivity to mobile devices located in a single family homes 116 or townhomes 114. Further, wireless communication equipment 106 may provide wireless connectivity to mobile devices or other computing devices located in a stadium. The computing devices within stadium may be streaming video of a special event such as a concert or sporting event. In addition, both wireless communication equipment 106, 108 may malfunction at the same time thereby creating a two different service outages. The service management server 102 can receive notification or otherwise detect the service outages as described herein. Detection or notification of the first service outage can be received before detection or notification of the second service outage.

In one or more embodiments, the streaming video of a special event may have a greater impact or higher priority to restore than restoring service to mobile devices to residential buildings 114, 116 that use the mobile service for entertainment services only. Thus the second customer impact due to the second service outage due wireless communication equipment 134 may be higher due to the streaming video content of the special event being affected (e.g. lost) than the first customer impact due to the first service outage due to the wireless communication equipment 108. In some embodiments, both service outages can affect streaming vice content of different special events. The service management server 102 can determine the priority of the streaming video content of each special event and assess the respective customer impact according such priorities.

Referring to FIGS. 1A-1C, in one or more embodiments, the service management server 102 can detect a first service outage and a second service outage. Further, the service management server can determine quality metrics, or degradation of quality metrics, of the communication network 104 or wireless communication equipment 106, 108. In addition, the service management server 102 can identify site priorities of each portion of communication network affected by a first service outage and a second service outage. Also, the service management server 102 can determine the number of complaints due to the first service outage and for the second service outage (i.e. each service outage). Further, the service management server 102 can determine whether streaming video content of a special event is affected by either service outage.

In one or more embodiments, the service management server 102 can calculate a first degradation score for a first degradation of a first quality metrics corresponding to the first service outage. Further, service management server 102 can calculate a second degradation score for a second degradation of a second quality metrics corresponding to the second service outage. In addition, the service management server 102 can calculate a first site score according to a first site priority for a first portion of the communication network and calculating a second site score according to a second site priority for a second portion of the communication network. Also, the service management server 102 can calculate special event score according to the streaming video of a special event affected by either the first service outage or second service outage. The service management server 102 can calculate a first complaint score according to identifying a first number of complaints due to the first service outage and can calculate a second complaint score according to identifying a second number of complaints due to the second service outage. Further, the service management server 102 can calculate a first aggregate score for the first service outage according to the first degradation score, first site score, and first complaint score (e.g. a scaling of the sum of the first degradation score, first site score, and first complaint score). In addition, the service management server 102 can calculate a second aggregate score for the second service outage according to the second degradation score, second site score, the special event score, and second complaint score (e.g. a scaling of the sum of the second degradation score, second site score, special event score, and second complaint score). Also, the service management server 102 can identify that the second customer impact is higher than the first customer impact. Further, such an identification can comprise identifying that the second customer impact is higher than the first customer impact according to the first aggregate score and the second aggregate score.

In one or more embodiments, the first degradation score, second degradation score, first site score, second site score, special event score, first complaint score, and second complaint score by weighting the first degradation of first quality metrics, second degradation of second quality metrics, first portion of the communication network, second portion of the communication network, special event, first number of complaints, and second number of complaints. For example, the first degradation of the first quality metrics and the second degradation of the second quality metrics can have a weighting factor of 1. Further, a portion of the communication network that includes a hospital can have a weighting factor of 2 for its site priority and a portion of the communication network that includes other emergency services (e.g. police department, fire department, etc.) can have a weighting factor of 1.5 for its site priority. In addition, a portion of the communication network that include residential building that use mobile service for entertainment purposes only can have a weighting factor of 1 for its site priority. Also, a service outage that affects the streaming video content of a special event can have a weighting factor of 2 in calculating its special events score. If a service outage that does not affect the streaming video content of a special event can have a weighting factor of 1 in calculating its special events score. Further, if the number of complaints due to a service outage can have a weighting factor of 1.2 in calculating its complaint score when the number of complaints is less than 10. In addition, if the number of complaints due to a service outage can have a weighting factor of 2 in calculating its complaint score when the number of complaints is more than 10 but less than 50. Also, the aggregate score can be scaling between 1 and 10 of the sum of the degradation of quality metrics score, site score, special event score, and complaints score.

Referring to FIG. 1A, the service management server 102 can determine that the wireless communication equipment 106, 108 have limited memory capacity causing a first service outage by wireless communication equipment 108 and a second service outage by wireless communication equipment 106. The limited memory capacity can be of equal degradation. Thus, the first degradation score can be 1 and the second degradation score can also be 1. Further, the portions of the communication network affected by both the first service outage and the second service outage include only residential buildings in which mobile devices use mobile service of entertainment services only. Thus, each portion of the communication network have equal site priority and each can have a site priority score of 1. Neither service outage affects streaming video of a special event. Thus, the special event score for each service outage can be 1. Further, the service management server 102 is notified or otherwise determines that the number of complaints due to the first service outage is 3 while the number of complaints due to the second service outage is 36. Accordingly, due to weighting factors described herein, the first complaint score can be 3.6 and the second complaint score can be 54. The first aggregate score can 6.6 and the second aggregate score can be 57. Further, a normalized or scaled first aggregate score and a second aggregate score can be 0.66 and 5.7, respectively (e.g. aggregate scores are scaled by 10 so that they are between 0 and 9). Hence, based on the aggregate scores, the second service outage is resolved prior to the first service outage, even if the service management server 102 is notified of the first service outage before being notified of the second service outage.

Referring to FIG. 1B, the service management server 102 can determine that the wireless communication equipment 106, 108 have limited memory capacity causing a first service outage by wireless communication equipment 108 and a second service outage by wireless communication equipment 106. The limited memory capacity can be of equal degradation. Thus, the first degradation score can be 1 and the second degradation score can also be 1. Further, the portion of the communication network affected by the first service outage include only residential buildings in which mobile devices use mobile service of entertainment services only. However, the portion of the communication network affected by the second service outage includes a hospital. Thus, the first portion of the communication network affected by the first service outage can have a site priority of 1 and the second portion of the communication network affected by the second service outage can have a site priority of 2. Neither service outage affects streaming video of a special event. Thus, the special event score for each service outage can be 1. Further, the service management server 102 is notified or otherwise determines that the number of complaints due to the first service outage is 3 while the number of complaints due to the second service outage is also 3. Accordingly, due to weighting factors described herein, the first complaint score can be 3.6 and the second complaint score can also be 3.6. The first aggregate score can 6.6 and the second aggregate score can be 7.6. Further, a normalized or scaled first aggregate score and a second aggregate score can be 0.66 and 0.76, respectively (e.g. aggregate scores are scaled by 10 so that they are between 0 and 9). Hence, based on the aggregate scores, the second service outage is resolved prior to the first service outage, even if the service management server 102 is notified of the first service outage before being notified of the second service outage.

Referring to FIG. 1C, the service management server 102 can determine that the wireless communication equipment 134, 108 have limited memory capacity causing a first service outage by wireless communication equipment 108 and a second service outage by wireless communication equipment 134. The limited memory capacity can be of equal degradation. Thus, the first degradation score can be 1 and the second degradation score can also be 1. Further, the portions of the communication network affected by both the first service outage and the second service outage include only residential buildings or venues for special events in which mobile devices use mobile service of entertainment services only. Thus, each portion of the communication network have equal site priority and each can have a site priority score of 1. The first service outage does not affect streaming video of a special event. Thus, the special event score for the first service outage can be 1. However, the second service outage affects the streaming video content of a special event from the stadium 132. Thus, the special event score fir the second service outage can 2 due to a weighting factor described herein. Further, the service management server 102 is notified or otherwise determines that the number of complaints due to the first service outage is 3 while the number of complaints due to the second service outage is 3. Accordingly, due to weighting factors described herein, the first complaint score can be 3.6 and the second complaint score can also be 3.6. The first aggregate score can 6.6 and the second aggregate score can be 7.6. Further, a normalized or scaled first aggregate score and a second aggregate score can be 0.66 and 0.77, respectively (e.g. aggregate scores are scaled by 10 so that they are between 0 and 9). Hence, based on the aggregate scores, the second service outage is resolved prior to the first service outage, even if the service management server 102 is notified of the first service outage before being notified of the second service outage.

Figure 2:
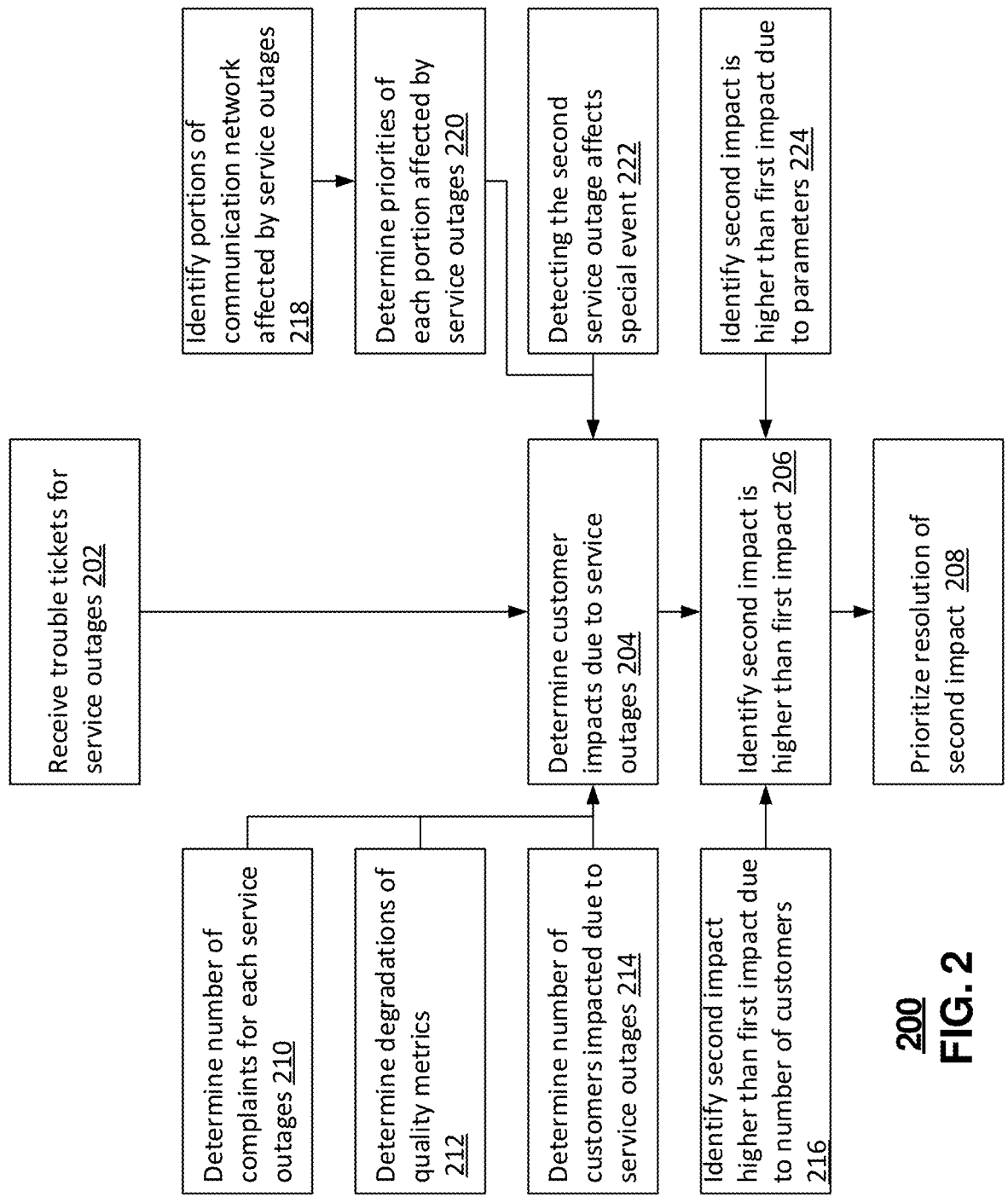
FIGS. 2-3 depict illustrative embodiments of methods used in portions of the systems described in FIGS. 1A-1C.
Figure 3:
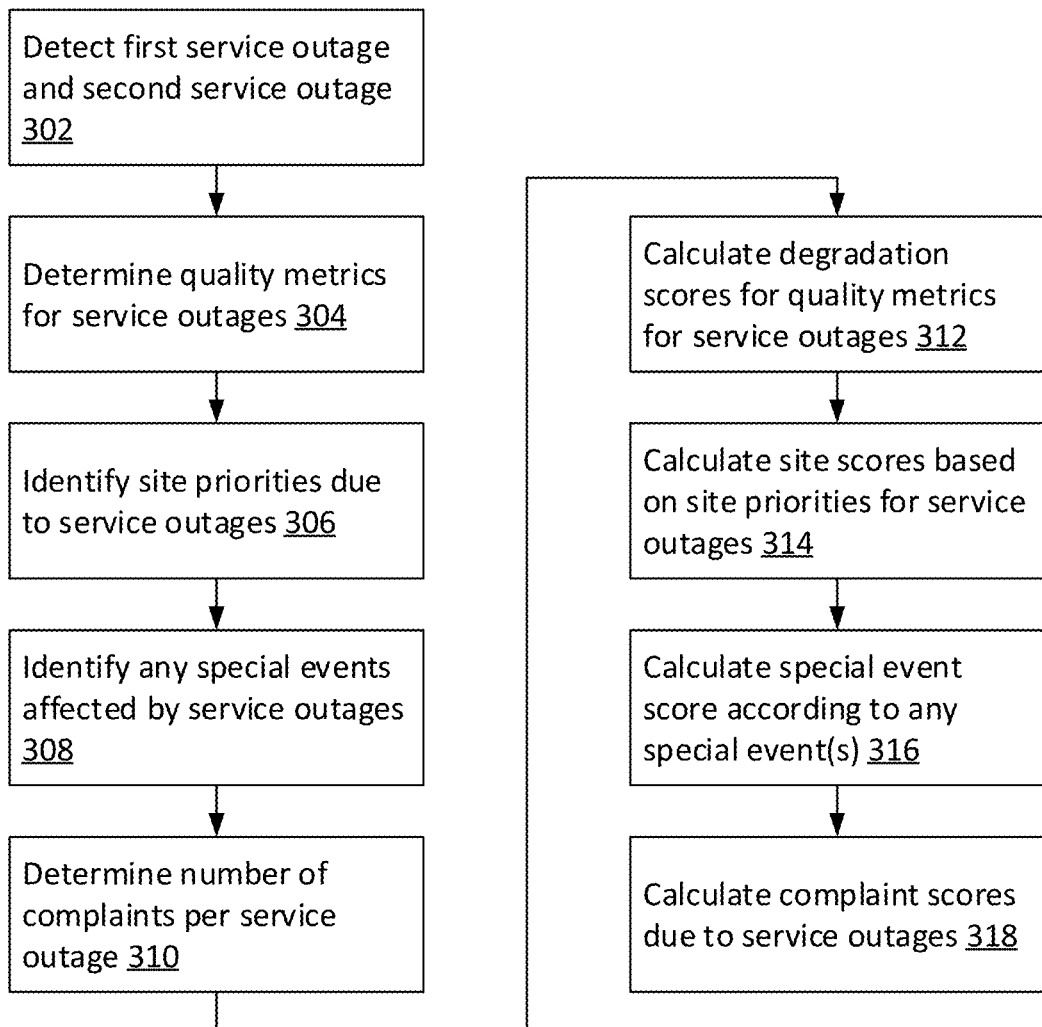

FIGS. 2-3 depict illustrative embodiments of methods used in portions of the systems described in FIGS. 1A-1C. Referring to FIG. 2, in one or more embodiments, a service management server, as described herein, can implement a method 200 via one or more software applications. The method 200 can include the service management server, at 202, receiving a first trouble ticket reporting a first service outage of a communication network and a second trouble ticket reporting a second service outage of the communication network. Further, the method 200 can include the service management server, at 204, determining a first customer impact according to the first service outage and determining a second customer impact according to the second service outage. In some embodiments, the method 200 can include the service management server, at 210, determining the first customer impact and the determining the second customer impact comprises identifying (or determining) a first number of complaints due to the first service outage and identifying (or determining) a second number of complaints due to the second service outage. In other embodiments, the method 200 can include the service management server can include, at 212, determining the first customer impact comprises detecting (or determining) a first degradation of a first quality metrics corresponding to the first service outage and wherein the determining the second customer impact comprises detecting (or determining) a second degradation of a second quality metrics corresponding to the second service outage. In further embodiments, the method 200 can include the service management server can include, at 214, determining the first customer impact comprises determining a first number of customers impacted by the first service outage and wherein the determining the second customer impact comprises determining a second number of customers impacted by the second service outage.

In additional embodiments, the method 200 can include the service management server, at 218, identifying a first portion of the communication network affected by the first service outage and identifying a second portion of the communication network affected by the second service outage. Further, the method 200 can include the service management server, at 220, determining a first site priority for the first portion of the communication network and determining a second site priority for the second portion of the communication network. In addition, the method can include the service management server determining the first customer service impact due to the first service outage according to the first site priority and determining the second customer service impact due to the second service outage according to the second site priority. In some embodiments, the method 200 can include the service management server, at 222, determining the second customer impact comprises detecting the second service outage affects streaming video content of a special event.

In one or more embodiments, the method 200 can include the service management server, at 206, identifying that the second customer impact is higher than the first customer impact. In some embodiments, the method 200 can include the service management server, at 216, identifying that the second customer impact is higher than the first customer impact comprises identifying that the second impact is higher than the first impact according to the first number of customer affected by the first service outage and the second number of customers affected by the second service outage. In other embodiments, the method 200 can include the service management server, at 224, identifying that the second customer impact is higher than the first customer impact according to the parameters such as the first number of complaints, second number of complaints, first degradation of quality metrics, second degradation of quality metrics, first site priority, second site priority, and special affects affect by either the first service outage or the second service outage. The method 200 can include the service management server, at 208, prioritizing a resolution of the second service outage over the first service outage according to the second customer impact being higher than the first customer impact.

Referring to FIG. 3, in one or more embodiments, a service management server, as described herein, can implement a method 300 via one or more software applications. The method 300 can include the service management server, at 302, detecting a first service outage and a second service outage. Further, the method 300 can include the service management server, at 304, determining quality metrics or degradation of quality metrics. In addition, the method 300 can include the service management server, at 306, identifying site priorities of each portion of communication network affected by a first service outage and a second service outage. Also, the method 300 can include the service management server, at 308, determining the number of complaints due to the first service outage and for the second service outage (i.e. each service outage).

In one or more embodiments, the method 300 can include the service management server, at 312, calculating a first degradation score for a first degradation of a first quality metrics corresponding to the first service outage. Further, the method 300 can include the service management server, at 314, calculating a second degradation score for a second degradation of a second quality metrics corresponding to the second service outage. In addition, the method 300 can include the service management server, at 314, calculating a first site score according to a first site priority for a first portion of the communication network and calculating a second site score according to a second site priority for a second portion of the communication network. Also, the method 300 can include the service management server, at 316, calculating a special event score according to streaming video content of a special event affected by either the first service outage or second service outage. The method 300 can include the service management server, at 318, calculating a first complaint score according to identifying a first number of complaints due to the first service outage and calculating a second complaint score according to identifying a second number of complaints due to the second service outage. Further, the method 300 can include the service management server calculating a first aggregate score for the first service outage according to the first degradation score, first site score, and first complaint score. In addition, the method 300 can include the service management server calculating a second aggregate score for the second service outage according to the second degradation score, second site score, the special event score, and second complaint score. In some embodiments, the first aggregate score and the second aggregate score can be scaled or normalized. Also, the method 300 can include the service management server can include identifying that the second customer impact is higher than the first customer impact comprises identifying that the second customer impact is higher than the first customer impact according to the first aggregate score and the second aggregate score.

While for purposes of simplicity of explanation, the respective processes are shown and described as a series of blocks in FIGS. 2-3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Further embodiments or portions thereof can be combined with other embodiments or portions thereof.

Figure 4:
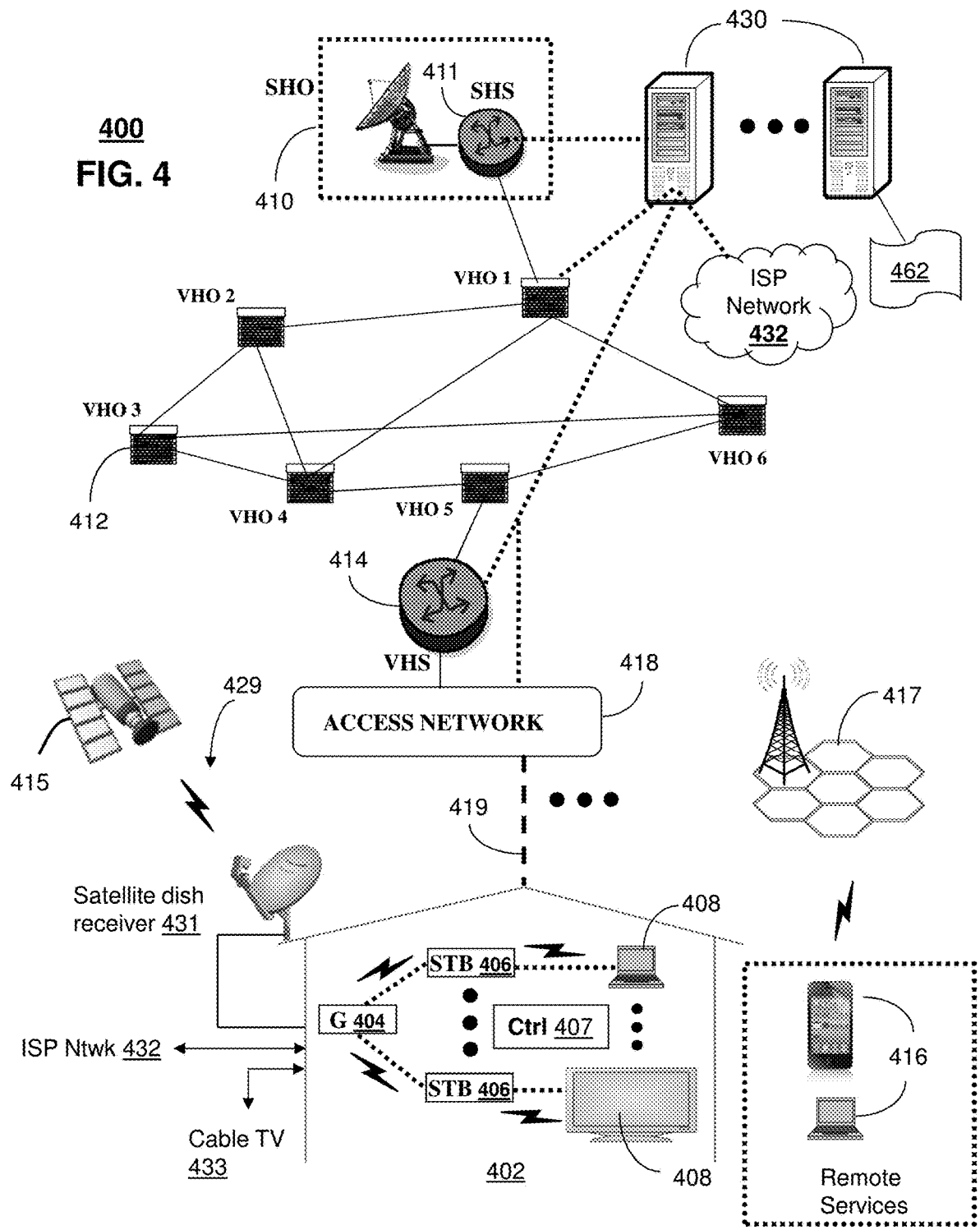
FIGS. 4-5 depict illustrative embodiments of communication systems that provide services such as prioritizing mobile network service outages.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with systems 100, 120, 130 of FIGS. 1A-1C as another representative embodiment of communication system 400. For instance, one or more devices illustrated in the communication system 400 of FIG. 4. Embodiments can include receiving a first trouble ticket reporting a first service outage of a communication network and a second trouble ticket reporting a second service outage of the communication network. Further, embodiments can include determining a first customer impact according to the first service outage and determining a second customer impact according to the second service outage. In addition, embodiments can include identifying that the second customer impact is higher than the first customer impact. Also, embodiments can include prioritizing a resolution of the second service outage over the first service outage according to the second customer impact being higher than the first customer impact.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a service management server (herein referred to as service management server 430). The service management server 430 can use computing and communication technology to perform function 462, which can include among other things, the service management techniques described by methods 200, 300 of FIGS. 2-3. For instance, function 46X of server 430 can be similar to the functions described for service management server 102 of FIGS. 1A-1C in accordance with methods 200, 300.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
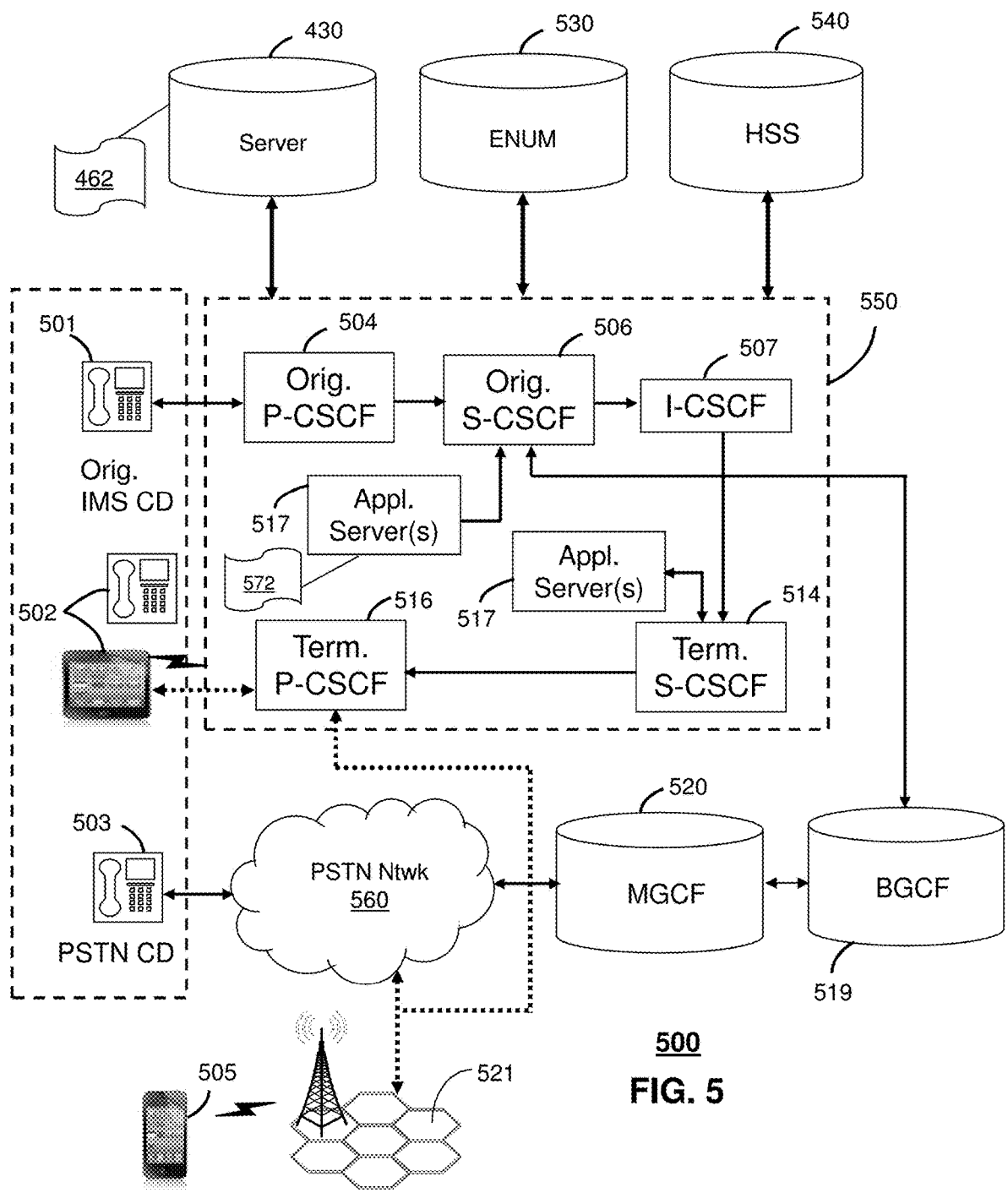

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with systems 100, 120, 130 of FIGS. 1A-1C and communication system 400 as another representative embodiment of communication system 400. Embodiments can include receiving a first trouble ticket reporting a first service outage of a communication network and a second trouble ticket reporting a second service outage of the communication network. Further embodiments can include determining a first customer impact according to the first service outage and a first number of customers impacted by the first service outage and determining a second customer impact according to the second service outage and a second number of customers impacted by the second service outage. Additional embodiments can include identifying that the second customer impact is higher than the first customer impact according to the first number of customers impacted by the first service outage and according to the second number of customers impacted by the second service outage. Other embodiments can include prioritizing a resolution of the second service outage over the first service outage according to the second customer impact being higher than the first customer impact.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The service management server 430 of FIG. 4 can be operably coupled to communication system 500 for purposes similar to those described above. Service management server 430 can perform function 462 and thereby provide service management services for communication networks similar to the functions described for service management server 102 of FIGS. 1A-1C in accordance with methods 200, 300 of FIGS. 2-3. Service management server 430 can be an integral part of the application server(s) 517 performing function 572, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3rd Generation Partnership Project (3GPP). It is further noted that some or all embodiments of the subject disclosure may in whole or in part modify, supplement, or otherwise supersede final or proposed standards published and promulgated by 3GPP.

Figure 6:
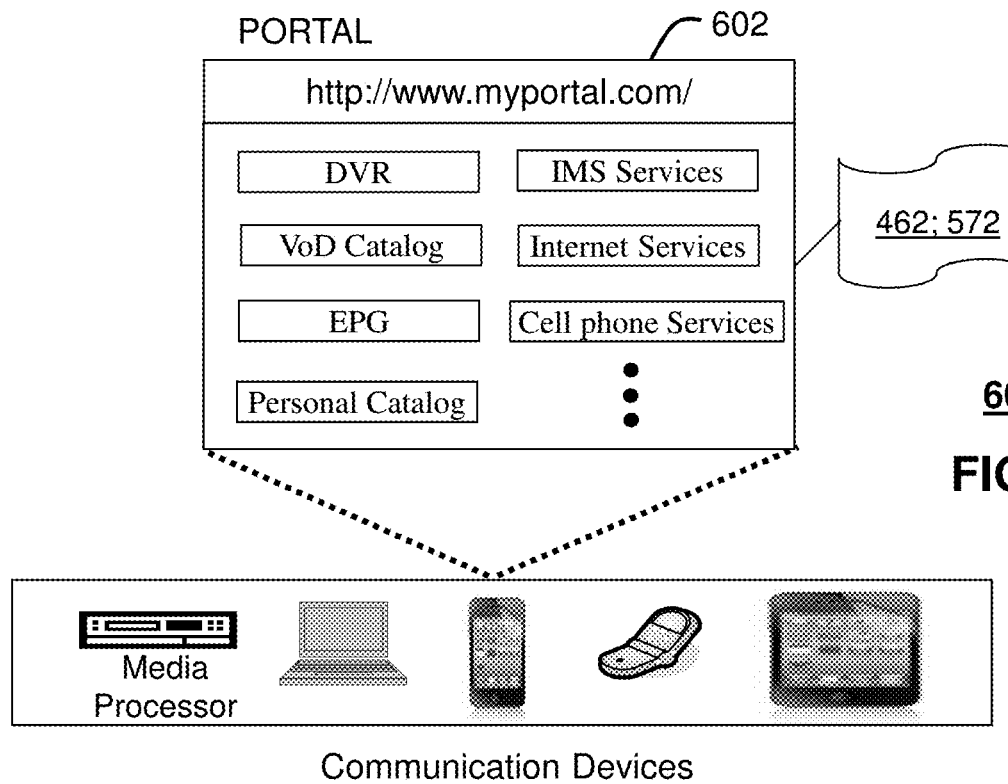
FIG. 6 depicts an illustrative embodiment of a web portal for interacting with the communication systems for prioritizing mobile network service outages.

FIG. 6 depicts an illustrative embodiment of a web portal 602 of a communication system 600. Communication system 600 can be overlaid or operably coupled with systems 100, 120, 130 of FIGS. 1A-1C, communication system 400, and/or communication system 500 as another representative embodiment of systems 100, 120, 130 of FIGS. 1A-1C, communication system 400, and/or communication system 500. The web portal 602 can be used for managing services of prioritizing and resolving service outages as described in systems 100, 120, 130 of FIGS. 1A-1C and communication systems 400-500. A web page of the web portal 602 can be accessed by a Uniform Resource Locator (URL) with an Internet browser using an Internet-capable communication device such as those described in FIGS. 1A-1C and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462, and 572 to adapt these applications as may be desired by subscribers and/or service providers of systems 100, 120, 130 of FIGS. 1A-1C, and communication systems 400-500. For instance, service provider personnel can log into their on-line accounts and provide the servers 102 or server 430 with service outage notification or trouble tickets as described herein, and so on. Service providers can log onto an administrator account to provision, monitor and/or maintain the systems 100, 120, 130 of FIGS. 1A-1C or server 430.

Figure 7:
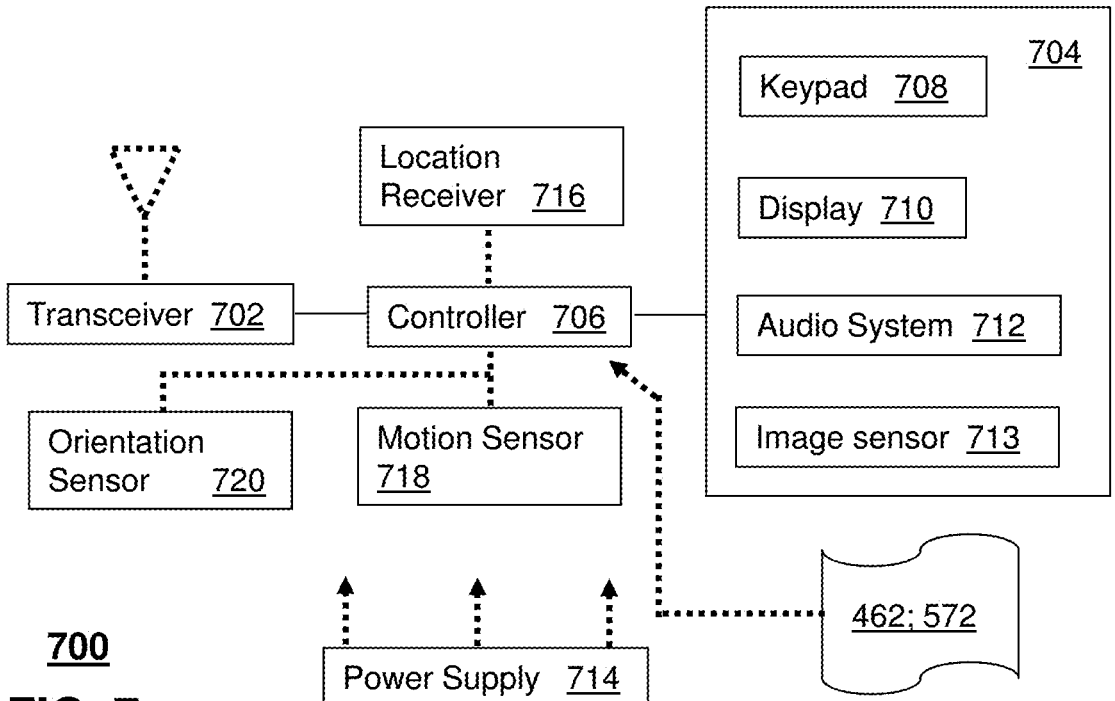
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1A-1C, and FIGS. 4-5 and can be configured to perform portions of methods 200, 300 of FIGS. 2-3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of devices of FIGS. 1A-1C, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in systems 100, 120, 130 of FIGS. 1A-1C, communication systems 400-500 of FIGS. 4-5 such as a gaming console and a media player. In addition, the controller 706 can be adapted in various embodiments to perform the functions 462 and 572, respectively.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
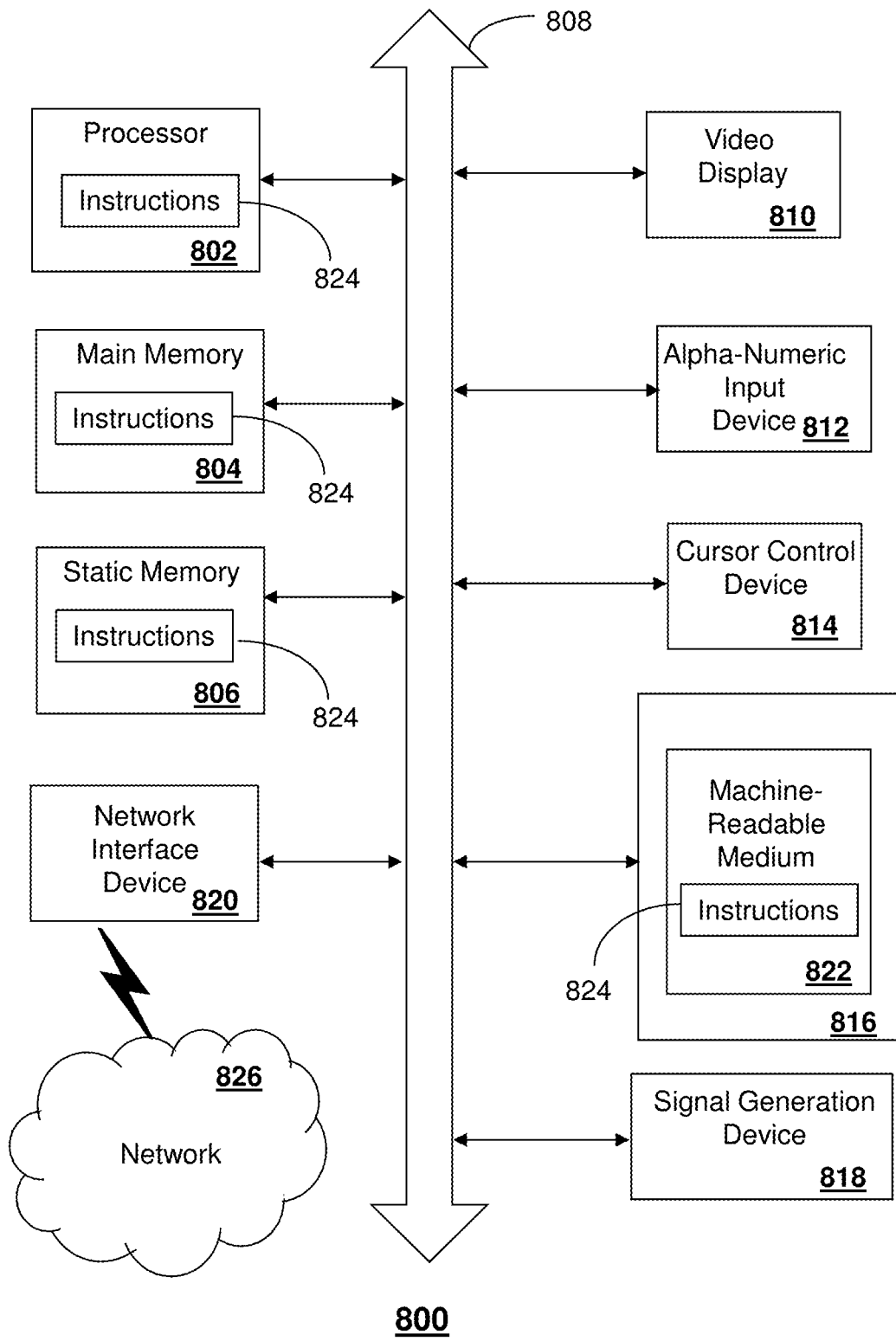
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the service management server 102, 430 and other devices of FIGS. 1A-1C. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system, facilitate performance of operations, comprising:
receiving a first trouble ticket reporting a first service outage of a communication network and a second trouble ticket reporting a second service outage of the communication network;
determining a first customer impact according to a first aggregate score, the first aggregate score determined according to the first service outage, and determining a second customer impact according to a second aggregate score, the second aggregate score determined according to the second service outage, wherein the first customer impact is determined by a first degradation of a first quality metrics, a first site priority of a first portion of the communication network, and a first number of complaints due to first service outage, wherein the first site priority is determined based on critical services performed at a site of the first portion of the communication network, wherein the second customer impact is determined by a second degradation of a second quality metrics, a second site priority of a second portion of the communication network, and a second number of complaints due to second service outage, wherein the second site priority is determined based on critical services performed at a site of the second portion of the communication network;

comparing the first aggregate score and the second aggregate score;

identifying that the second customer impact is higher than the first customer impact based on the comparing of the first aggregate score and the second aggregate score, including identifying that the second customer impact is higher than the first customer impact according to a first number of customers impacted by the first service outage and according to a second number of customers impacted by the second service outage;

prioritizing a resolution of the second service outage over the first service outage according to the second customer impact being higher than the first customer impact; and resolving the second service outage and the first service outage according to the prioritizing, where the resolving comprises reconfiguring one or more network resources by communicating a command from the processing system to the one or more network resources.

2. The device of claim 1, wherein the determining the first customer impact comprises determining a first number of customers impacted by the first service outage and wherein the determining the second customer impact comprises determining a second number of customers impacted by the second service outage.

3. The device of claim 2, wherein the identifying that the second customer impact is higher than the first customer impact comprises identifying that the second customer impact is higher than the first customer impact according to the first number of customers impacted by the first service outage and according to the second number of customers impacted by the second service outage.

4. The device of claim 1, wherein the determining the first customer impact comprises detecting the first degradation of the first quality metrics corresponding to the first service outage and wherein the determining the second customer impact comprises detecting the second degradation of the second quality metrics corresponding to the second service outage.

5. The device of claim 1, wherein the determining the first customer impact and the determining the second customer impact comprises:

identifying the first portion of the communication network affected by the first service outage;

identifying the second portion of the communication network affected by the second service outage; and determining the first site priority for the first portion of the communication network and determining the second site priority for the second portion of the communication network.

6. The device of claim 1, wherein the determining the second customer impact comprises detecting the second service outage affects a streaming of video content of a special event.

7. The device of claim 1, wherein the determining the first customer impact and the determining the second customer impact comprises identifying the first number of complaints due to the first service outage and identifying the second number of complaints due to the second service outage.

8. The device of claim 1, wherein the identifying that the second customer impact is higher than the first customer impact comprises identifying that the second customer impact is higher than the first customer impact according to at least one of the first degradation of the first quality metrics, the second degradation of the second quality metrics, the first site priority for the first portion of the communication network affected by the first service outage, the second site priority for the second portion of the communication network affected by the second service outage, a streaming video content of a special event affected by the second service outage, the first number of complaints due to the first service outage, and the second number of complaints due to the second service outage.

9. The device of claim 1, wherein determining the first customer impact and the determining the second customer impact comprises:

calculating a first degradation score for the first degradation of the first quality metrics corresponding to the first service outage;

calculating a second degradation score for the second degradation of the second quality metrics corresponding to the second service outage;

calculating a first site score according to the first site priority for the first portion of the communication network;

calculating a second site score according to the second site priority for the second portion of the communication network;

calculating a special event score according to a streaming video content of a special event affected by the second service outage;

calculating a first complaint score according to identifying the first number of complaints due to the first service outage;

calculating a second complaint score according to identifying the second number of complaints due to the second service outage;

calculating the first aggregate score for the first service outage according to the first degradation score, first site score, and first complaint score; and calculating the second aggregate score for the second service outage according to the second degradation score, second site score, the special event score, and second complaint score, wherein identifying that the second customer impact is higher than the first customer impact comprises identifying that the second customer impact is higher than the first customer impact according to the first aggregate score and the second aggregate score.

10. A machine-readable storage medium, comprising executable instructions that, when executed by a processing system including a processor, facilitate performance of operations, comprising:

receiving a first trouble ticket reporting a first service outage of a communication network and a second trouble ticket reporting a second service outage of the communication network;

determining a first customer impact according to a first aggregate score, the first aggregate score determined according to the first service outage, and determining a second customer impact according to a second aggregate score, the second aggregate score determined according to the second service outage, wherein the first customer impact is determined by a first degradation of first quality metrics, a first site priority of a first portion of the communication network, and a first number of complaints due to first service outage, wherein the first site priority is determined based on critical services performed at a site of the first portion of the communication network, wherein the second customer impact is determined by a second degradation of a second quality metrics, a second site priority of a second portion of the communication network, and a second number of complaints due to second service outage, wherein the second site priority is determined based on critical services performed at a site of the second portion of the communication network;

comparing the first aggregate score and the second aggregate score;

identifying that the second customer impact is higher than the first customer impact according to the comparing the first aggregate score and the second aggregate score, including identifying that the second customer impact is higher than the first customer impact according to a first number of customers impacted by the first service outage and according to a second number of customers impacted by the second service outage;

prioritizing a resolution of the second service outage over the first service outage according to the second customer impact being higher than the first customer impact; and resolving the second service outage and the first service outage according to the prioritizing, where the resolving comprises reconfiguring one or more network resources by communicating a command from the processing system to the one or more network resources.

11. The machine-readable storage medium of claim 10, wherein the determining the first customer impact comprises detecting a first degradation of a first quality metrics corresponding to the first service outage and wherein the determining the second customer impact comprises detecting a second degradation of a second quality metrics corresponding to the second service outage.

12. The machine-readable storage medium of claim 10, wherein the determining the first customer impact and the determining the second customer impact comprises:

identifying the first portion of the communication network affected by the first service outage;

identifying the second portion of the communication network affected by the second service outage; and determining the first site priority for the first portion of the communication network and determining the second site priority for the second portion of the communication network.

13. The machine-readable storage medium of claim 10, wherein the determining the second customer impact comprises detecting the second service outage affects a streaming video content of a special event.

14. The machine-readable storage medium of claim 10, wherein the determining the first customer impact and the determining the second customer impact comprises identifying a first number of complaints due to the first service outage and identifying a second number of complaints due to the second service outage.

15. The machine-readable storage medium of claim 10, wherein the identifying that the second customer impact is higher than the first customer impact comprises identifying that the second customer impact is higher than the first customer impact according to at least one of a first degradation of a first quality metrics, a second degradation of a second quality metrics, the first site priority for the first portion of the communication network affected by the first service outage, the second site priority for the second portion of the communication network affected by the second service outage, a streaming video content of a special event affected by the second service outage, a first number of complaints due to the first service outage, and a second number of complaints due to the second service outage.

16. The machine-readable storage medium of claim 10, wherein the determining the first customer impact and the determining the second customer impact comprises calculating a first degradation score for a first degradation of a first quality metrics corresponding to the first service outage;

calculating a second degradation score for a second degradation of a second quality metrics corresponding to the second service outage;

calculating a first site score according to the first site priority for the first portion of the communication network;

calculating a second site score according to the second site priority for the second portion of the communication network;

calculating a special event score according to a streaming video content of a special event affected by the second service outage;

calculating a first complaint score according to identifying a first number of complaints due to the first service outage;

calculating a second complaint score according to identifying a second number of complaints due to the second service outage;

calculating the first aggregate score for the first service outage according to the first degradation score, first site score, and first complaint score; and calculating the second aggregate score for the second service outage according to the second degradation score, second site score, the special event score, and second complaint score, wherein identifying that the second customer impact is higher than the first customer impact comprises identifying that the second customer impact is higher than the first customer impact according to the first aggregate score and the second aggregate score.

17. A method, comprising:

receiving, by a processing system including a processor, a first trouble ticket reporting a first service outage of a communication network and a second trouble ticket reporting a second service outage of the communication network;

determining, by the processing system, a first customer impact according to a first aggregate score, the first aggregate score determined according to the first service outage, and determining a second customer impact according to a second aggregate score, the second aggregate score determined according to the second service outage, wherein the first customer impact is determined by a first degradation of a first quality metrics, a first site priority of a first portion of the communication network, and a first number of complaints due to first service outage, wherein the first site priority is determined based on critical services performed at a site of the first portion of the communication network, wherein the second customer impact is determined by a second degradation of a second quality metrics, a second site priority of a second portion of the communication network, and a second number of complaints due to second service outage, wherein the second site priority is determined based on critical services performed at a site of the second portion of the communication network;

comparing, by the processing system, the first aggregate score and the second aggregate score;

identifying, by the processing system, that the second customer impact is higher than the first customer impact including identifying that the second customer impact is higher than the first customer impact according to a first number of customers impacted by the first service outage and according to a second number of customers impacted by the second service outage;

prioritizing, by the processing system, a resolution of the second service outage over the first service outage according to the second customer impact being higher than the first customer impact; and resolving, by the processing system, the second service outage and the first service outage according to the prioritizing, wherein the resolving comprises reconfiguring one or more network resources by communicating a command from the processing system to the one or more network resources.

18. The method of claim 17, wherein the determining the first customer impact comprises determining, by the processing system, a first number of customers impacted by the first service outage and wherein the determining, by the processing system, the second customer impact comprises determining a second number of customers impacted by the second service outage.

19. The method of claim 18, wherein the identifying that the second customer impact is higher than the first customer impact comprises identifying, by the processing system, that the second customer impact is higher than the first customer impact according to the first number of customers impacted by the first service outage and according to the second number of customers impacted by the second service outage.

20. The method of claim 17, wherein the determining the first customer impact and the determining the second customer impact comprises:

calculating, by the processing system, a first degradation score for the first degradation of the first quality metrics corresponding to the first service outage;

calculating, by the processing system, a second degradation score for the second degradation of the second quality metrics corresponding to the second service outage;

calculating, by the processing system, a first site score according to the first site priority for a first portion of the communication network;

calculating, by the processing system, a second site score according to the second site priority for a second portion of the communication network;

calculating, by the processing system, a special event score according to a streaming video content of a special event affected by the second service outage;

calculating, by the processing system, a first complaint score according to identifying a first number of complaints due to the first service outage;

calculating, by the processing system, a second complaint score according to identifying a second number of complaints due to the second service outage;

calculating, by the processing system, the first aggregate score for the first service outage according to the first degradation score, first site score, and first complaint score; and calculating, by the processing system, the second aggregate score for the second service outage according to the second degradation score, second site score, the special event score, and second complaint score, wherein identifying that the second customer impact is higher than the first customer impact comprises identifying that the second customer impact is higher than the first customer impact according to the first aggregate score and the second aggregate score.

* * * * *